April 23, 1946.　　　　H. I. SIDES　　　　2,398,863
BASKET CARRYING CART
Filed April 4, 1945　　　3 Sheets-Sheet 1

INVENTOR.
Harold I. Sides,
BY
Cromwell, Greist & Warden
Attys.

April 23, 1946.  H. I. SIDES  2,398,863
BASKET CARRYING CART
Filed April 4, 1945  3 Sheets-Sheet 2
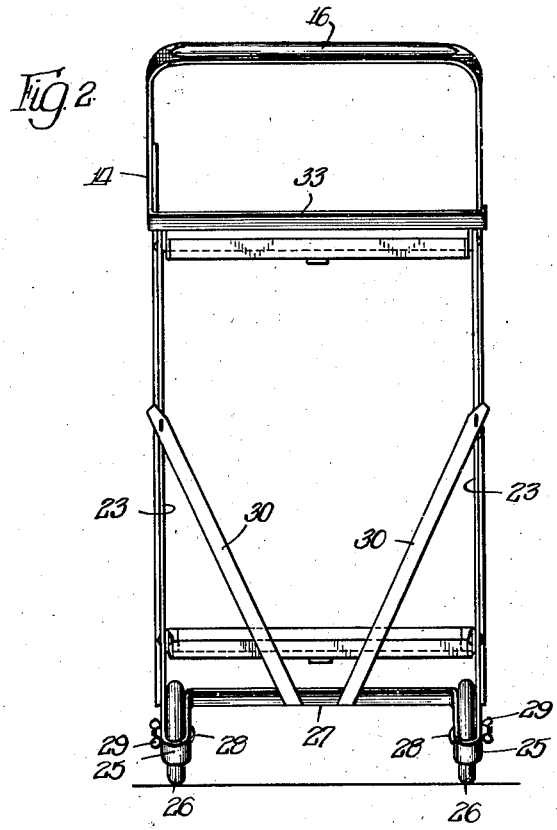
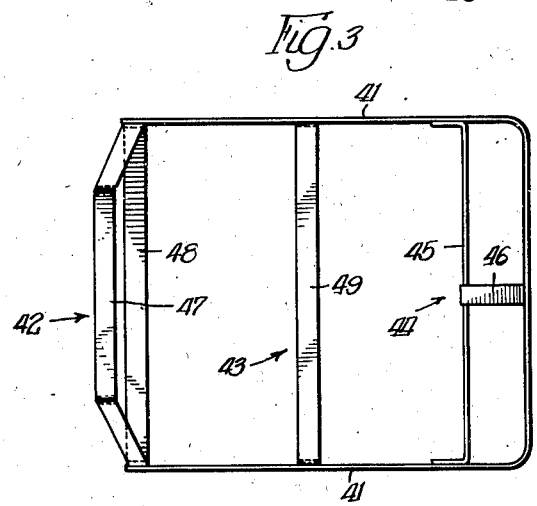
INVENTOR.
Harold I. Sides,
BY April 23, 1946.     H. I. SIDES     2,398,863
BASKET CARRYING CART
Filed April 4, 1945     3 Sheets-Sheet 3
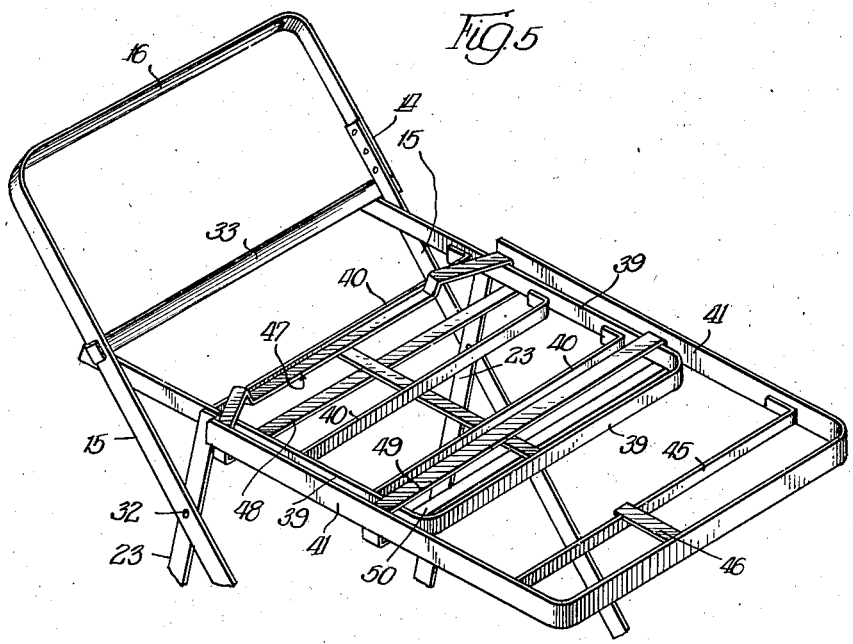
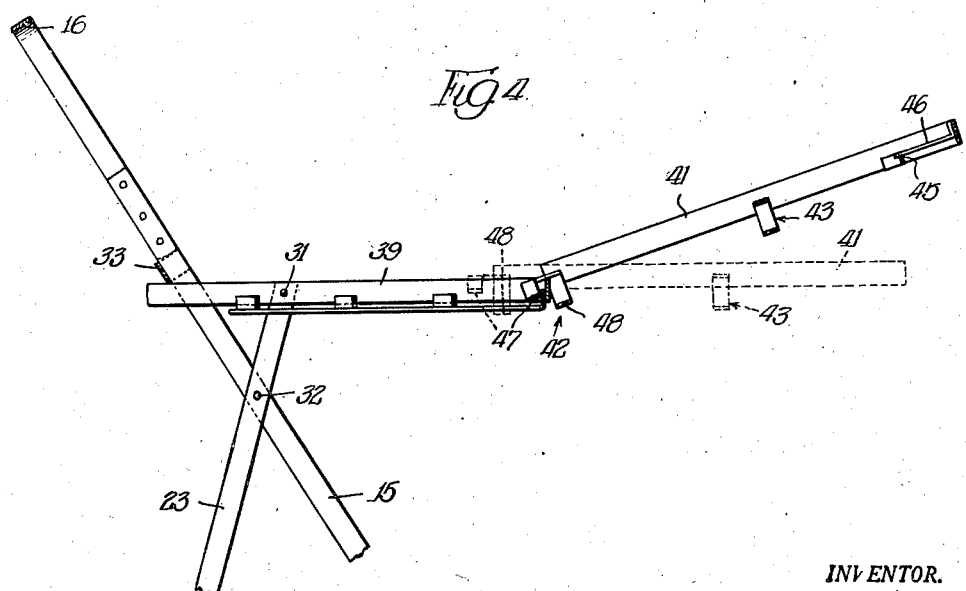
INVENTOR.
Harold I. Sides,
BY
Cromwell, Greist & Warden
ATTYS.

Patented Apr. 23, 1946

2,398,863

UNITED STATES PATENT OFFICE 2,398,863

BASKET CARRYING CART

Harold I. Sides, Chicago, Ill.

Application April 4, 1945, Serial No. 586,473

11 Claims. (Cl. 280—41)

The present invention relates to improvements in basket carrying carts of the type employed in self-service stores, in which a basket carrying shelf is supported in horizontal position, embodying a novel type of frame construction which can be made either collapsible or non-collapsible.

A collapsible type of frame and shelf construction for a basket carrying cart is disclosed and claimed in my co-pending application, Serial No. 464,712, filed November 6, 1942, Patent No. 2,377,815, issued June 5, 1945, and one of the objects of the present invention is to provide an improved construction of that type of cart.

Generally, it is an object of the present invention to provide a basket carrying cart which is simple as well as durable and rigid in construction, economical of manufacture, and otherwise well suited to the purpose for which it is intended.

More specifically, an object of the present invention is to provide a basket carrying cart of the type above mentioned, comprising a rigidly constructed frame for holding a shelf in basket carrying position and having wheels carried within the lower part of the frame, the latter including a single strip of suitable material providing oppositely disposed side bars and upper and lower end bars, and a second single strip to provide a supporting side bar for the first named side bars, the supporting side bar being curved out of its plane and back upon itself with portions in spaced apart relationship providing a wheel support.

Another object of the invention is to provide a cart of the type herein described with an auxiliary basket carrying shelf adapted detachably to be mounted upon the upper shelf of such a cart, the auxiliary shelf constituting frame sections having connecting members, one of which is disposed across one end thereof and the other of which is disposed inwardly thereof, each member comprising upper and lower portions spaced apart to bear against the top and bottom of the first named shelf across different areas thereof, the auxiliary shelf being of a width approximately the length of the first named shelf and of a length approximately twice the width thereof, whereby at least two baskets of a size adapted to be accommodated by the first named shelf can be carried by the auxiliary shelf.

A further object of the invention is to provide such a cart with a basket carrying shelf having spaced apart flat strip portions positioned with their narrow edges uppermost, the strips being joined by similar strips against their flat faces which similarly are positioned with their uppermost edges below the uppermost edges of the first named strips, the inner faces of the first named spaced apart flat strips providing basket retaining surfaces.

Still another object of the invention is to provide rear braces for a cart of the type herein described having supporting side bars formed from a single strip with portions in spaced apart relationship providing wheel supports connected by the remaining intermediate portion of the single strip, in which the rear braces reinforce said intermediate portion with the supporting side bars.

Other objects of the invention will in part be obvious and will in part appear hereinafter.

The invention accordingly comprises an article of manufacture possessing the features, properties and relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

Fig. 2 is a rear elevational view of the cart shown in Fig. 1;

Fig. 3 is a top plan view of an auxiliary basket carrying shelf adapted detachably to be mounted upon an upper basket carrying shelf of a cart such as that indicated in Fig. 1;

Fig. 4 is an end elevational view of the upper part of such a cart illustrating the manner of manipulating the auxiliary shelf manually to attach it to the upper basket carrying shelf of the cart;

Fig. 5 is a perspective view of the upper portion of the basket carrying cart of Fig. 4 illustrating the manner in which the auxiliary shelf is secured to the upper basket carrying shelf;

Referring more particularly to the drawings, there is indicated generally at 10 a basket carrying cart. The particular construction and arrangement of parts herein used for purposes of illustration shows a collapsible type of cart, the novel features relating to collapsibility being covered in the above mentioned patent application. While a collapsible type of cart is herein depicted, it should be understood that the invention is not confined to this type but is equally applicable to other types of carts, such as the non-collapsible kind, so that the invention should not be regarded as limited in this respect.

In this cart, as in other similar types of carts, there is at least one upper basket carrying shelf generally indicated at 11 and preferably also a lower basket carrying shelf generally indicated at 12, each of which is supported in substantially horizontal position for use.

Figure 7:
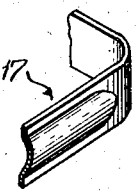
Fig. 7 is a perspective view of a fragment taken either from the bumper bar or the handle.

A rigidly constructed frame is generally indicated at 13 for holding one or both of the shelves 11 and 12 in basket carrying position. The frame 13 includes an upwardly and rearwardly inclined member comprising a single strip of flat metal of generally rectangular configuration, the ends of which are connected together, as indicated generally at 14, in any suitable manner, such as, by riveting, welding, or the like. Such a construction provides oppositely disposed side bars 15, 15 and upper and lower end bars, the upper end bars providing a handle bar 16 and the lower end bar providing a wheel support and bumper bar indicated generally at 17. Preferably, the bumper bar, as well as the handle, is rounded in cross section as fully illustrated in Fig. 7. This lends greater strength and rigidity to these parts and enhanced gripping characteristics to the handle. In this particular construction it will be seen that the lower part of each side bar 15, 15 is curved out of its plane to a horizontal position as indicated at 18, 18 in order conveniently to provide supports for front caster wheels 19, 19. The casters for the wheels are secured inside the angular corners provided by the rectangularly shaped frame in any suitable manner such as by brackets 20, 20 to position the shaft of each caster 21, 21 in upright position. While the frame 13 illustrates a single strip of metal it is contemplated that, under certain conditions where greater speed and facility of handling is desired in shaping such material in the presses utilized for that purpose, the frame can be made in two pieces suitably spliced together.

A second single strip of flat metal, indicated generally at 22, is utilized to provide a supporting structure for the frame 13 as well as the shelves 11 and 12. It will be seen that the strip 22 provides side bars 23, 23 and that each is curved rearwardly out of its plane at its lower part, as indicated generally at 24, 24, and then bent back upon itself with portions in spaced apart relationship as shown at 25, 25, each thereby providing a wheel support for wheels 26, 26. The spaced apart portions are connected by the remaining intermediate portion 27 of the single strip 23. The wheels 26, 26 preferably are each held in pivotal position by a bolt 28, 28, held in place by wing nuts 29, 29. This type of construction is particularly advantageous in that an axle running from one side of the cart to the other to hold both of the wheels 26, 26 in mounted position is thereby eliminated.

The supporting side bars 23, 23, and the intermediate lower portion 27 between the wheels 26, 26, are reinforced with respect to each other by braces 30, 30. These braces can be secured at their ends to the respective supporting side bars 23, 23 and lower portions 27 in any suitable manner such as, for example, by welding. This type of rigid construction insures a cart of great strength which will readily support more than the normal load carried by conventional upper shelves.

It will be seen that the basket carrying shelf is pivotally secured to the upper end of the supporting side bars 23, 23 at 31, 31. The supporting side bars 23, 23 are pivotally attached to the side bars 15, 15 at 32, 32 in scissor-like fashion. The shelf 11 is held in horizontal position by a cross bar 33 connected to the side bars 15, 15 which acts as a stop for the shelf. The ends of the lower shelf 12 are pivotally mounted to the supporting side bars 23, 23 at 34, 34. The forward end of the shelf 12 is prevented from dropping below horizontal position by a cross bar 35 which is connected to the side bars 15, 15. Toggle links 36, 36 are pivotally secured to the sides of the lower shelf 12 at 37, 37 at one end, and to the bars 15, 15 at 38, 38 at the other end.

To collapse the cart, the upper basket carrying shelf 11 may first be tilted upwardly into inverted position until the handle bar 16 is disposed within easy finger-grip distance of the forward end of the upper shelf 11. The handle bar 16 and the forward cross bar of the shelf 11 are then grasped in the operator's hand and squeezed together, whereupon the entire cart should fully collapse into flattened out and readily stackable position. To set up the cart again, it is merely necessary to swing the lower carrier 12 downwardly into its horizontal position. This movement of the carrier 12 will cause the side bars 15, 15 and the supporting bars 23, 23 of the frame to open up. The upper basket carrying shelf 11 may then be swung downwardly into its horizontal position.

Figure 1:
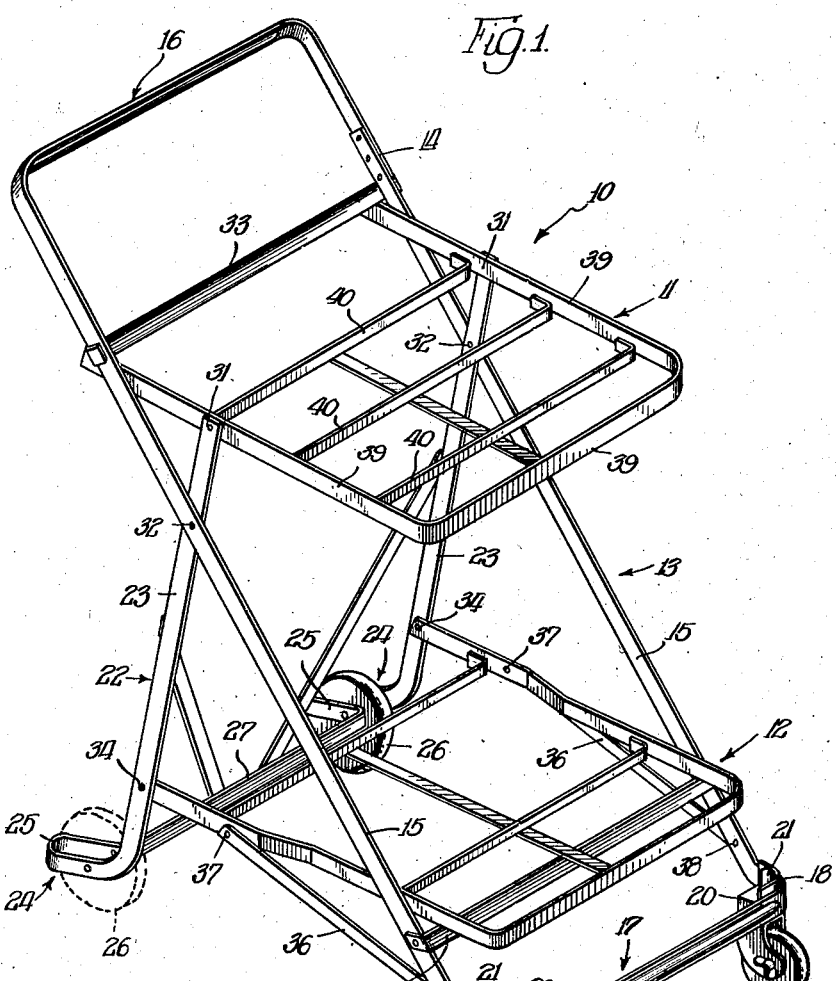
Fig. 1 is a perspective view of a basket carrying cart constructed in accordance with the principles of the present invention.
Figure 6:
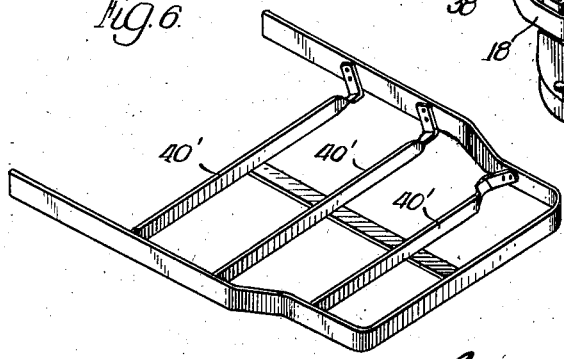
Fig. 6 is a perspective view of a fragmentary portion of an upper basket carrying shelf for such a cart illustrating a modified structural arrangement of parts.

Another feature of the invention is the basket carrying shelf construction in which the rigidity feature provided by the side frames is more fully carried out. The basket carrying shelf 11, for example, is provided by spaced apart flat strip portions 39, 39, also preferably formed from a single piece of flat metal into generally U-shaped configuration. These strips are joined by similar flat strips 40 which are also positioned with their uppermost edges below the uppermost edges of the strips 39, 39, and are secured in this position in any suitable manner as by welding or the like. In this type of construction, with the smaller strips positioned downwardly of the larger strips, there is provided by the inner faces of the larger strips 39, 39, a basket retaining surface. The same type of construction can be applied to the lower basket carrying shelf 12. It will be appreciated that in addition to the basket retaining surfaces which are provided by the arrangement of the parts the edgewise positioning of the strip provides for great strength and further enhances the rigidity characteristic of the cart. In the modified form of shelf illustrated in Fig. 6, strips 40' are dipped downwardly so as to reach a point even further below the uppermost edges of the strips 39, 39, but are given a twist throughout their span so as to bring the flat portion into vertical position. By lowering the strips even further in this manner, the basket retaining characteristics of the strips 39, 39, are considerably enhanced.

A further important feature is the auxiliary shelf illustrated in Figs. 3, 4 and 5. This shelf comprises side frame sections 41, 41 having a connecting member disposed across one end indicated generally at 42, and another connecting member inwardly of the latter indicated generally at 43 and preferably at about an intermediate point across the frame sections 41, 41. Preferably, also, further reinforcing members indicated generally at 44 may be utilized. These constitute a strap, or flat piece of metal 45 in edgewise position connecting the frame sections 41, 41. Further bracing the strip 40 at an intermediate point to the forward end of the frame is a strip of flat metal 46. It will be seen that the spaced apart member 42 consists of upper and lower portions 47 and 48. The member 43 consists of upper and lower portions 49 and 50. Both portions of each member 42 and 43, as well as the members 44 and 45, are so arranged that they are below the uppermost edges of the frame sections 41, 41 whereby the latter also provide flat inner faces resulting in basket retaining surfaces in a manner similar to that described in connection with the upper basket carrying shelf 11 and the lower basket carrying shelf 12.

Referring now to the upper spaced apart member 42, it will be seen that it has its upper spaced apart portion 47 outwardly projecting and centrally depressed. Also, it is spaced a distance upwardly from the lower portion 47 which is less than the width of the forward end 39 of the upper basket carrying shelf 11. This provides an engaging and disengaging hook for the auxiliary shelf 41, all as more fully indicated in Figs. 4 and 5, whereby the same can be manipulated into the position indicated from the solid line to the dotted line position shown in Fig. 4 by hooking the auxiliary shelf to the forward end 39 of the basket carrying shelf 11. This permits the shelf to drop down to the dotted line position. By this manual manipulation the auxiliary shelf can be advanced to the position indicated in Fig. 5. By means of the spaced apart member 43, the auxiliary shelf is held in the projecting position indicated in Fig. 5. When the auxiliary shelf is in the position indicated in Fig. 5, the upper and lower spaced apart portions 47 and 48 of the member 42, and the upper and lower spaced apart portions 49 and 50 of the member 43, respectively bear against the top and bottom of the upper basket carrying shelf 11 across different areas in such a manner as rigidly to hold the same in basket carrying position.

It is important to observe that the auxiliary shelf should be of a width approximately the length of the basket carrying shelf 11 and of a length approximately twice the width thereof. By this construction at least two baskets of a size adapted to be accommodated by the shelf 11, or the lower shelf 12, can be carried by the auxiliary shelf. At least three baskets can therefore be carried with the present type of construction utilizing the auxiliary shelf. However, where only two baskets are filled by a customer they can both be carried on the upper basket carrying shelf 11 when the auxiliary shelf is used and it is unnecessary for them constantly to be stooping down to reach a lower basket ordinarily carried on the lower shelf 12.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a basket carrying cart of a type such as that used in self-service stores, in which a basket carrying shelf is supported in substantially horizontal position, the improvement comprising a rigidly constructed frame for holding said shelf in basket carrying position and having wheels carried within the lower part of the frame, said frame including a single strip providing oppositely disposed side bars and upper and lower end bars, said upper end bar providing a handle bar for said cart and said lower end bar providing a wheel support, and a second single strip providing a supporting side bar for said first named side bar, said supporting side bar being curved out of its plane and back upon itself with portions in spaced apart relationship providing a wheel support.

2. In a basket carrying cart of the type employed in self-service stores, in which at least one basket carrying shelf is supported in substantially horizontal position, the improvement comprising a rigidly constructed frame for holding said shelf in basket carrying position and having wheels carried within the lower part of the frame, said frame including a single strip whose ends are connected together providing oppositely disposed side bars and upper and lower end bars, said upper end bar providing a handle bar for said cart and said lower end bar providing a wheel support, and a second single strip providing supporting side bars for said first named side bars and said shelf, each supporting side bar being curved out of its plane and back upon itself with portions in spaced apart relationship providing a wheel support and connected by the remaining portion of the second single strip.

3. In a basket carrying cart of the type used in self-service stores, in which at least one basket carrying shelf is supported in substantially horizontal position, the improvement comprising a rigidly constructed frame for holding said shelf in basket carrying position and having wheels carried within the lower part of the frame, said frame including an upwardly and rearwardly inclined member comprising a single strip of generally rectangular configuration providing oppositely disposed side bars and upper and lower end bars, said upper end bar providing a handle bar for said cart and each of said side bars being curved out of its plane to horizontal position providing a wheel support, and a second single strip providing supporting side bars for said first named side bars, each supporting side bar being curved out of its plane and back upon itself with portions in spaced apart relationship providing a wheel support and connected by the remaining intermediate portion of the second single strip.

4. A cart of the character defined by claim 3, and wherein said supporting side bars and said remaining intermediate portion of the second single strip are braced with respect to each other by reinforcing strips connecting the same.

5. A cart of the character defined by claim 3, and wherein the basket carrying shelf is provided by spaced apart flat strip portions positioned with a narrow edge uppermost, said strips being joined by similar strips against their flat inner surfaces and similarly being positioned with the uppermost edges of the last named strip below the uppermost edges of said first named strips, the inner faces of the spaced apart first named flat strips providing basket retaining surfaces.

6. In a basket carrying cart of the type employed in self-service stores, in which at least one basket carrying shelf is supported in substantially horizontal position, the improvement comprising an auxiliary basket carrying shelf adapted detachably to be mounted upon said first named shelf, which includes frame sections having connecting members, one of which is disposed across one end thereof and the other of which is disposed inwardly thereof, each member comprising upper and lower portions spaced apart to bear against the top and bottom of said first named shelf across different areas thereof, said auxiliary shelf being of a width approximately the length of said first named shelf and of a length approximately twice the width thereof, whereby at least two baskets of a size adapted to be accommodated by said first named shelf can be carried by said auxiliary shelf.

7. An auxiliary basket carrying shelf according to the character of that defined by claim 6, and wherein the frame sections are composed of flat strips with a narrow edge uppermost with the upper spaced apart portions of said connecting members being below said uppermost edges, whereby the inner flat faces of said side frame sections provide basket retaining surfaces.

8. An auxiliary basket carrying shelf according to the character of that defined by claim 6, and wherein said end connecting member has its upper spaced apart portion outwardly projecting and centrally depressed, and spaced a distance from the lower spaced apart portion which is less than the width of the forward end of said first mentioned shelf, whereby to provide an engaging and disengaging hook for said auxiliary shelf and to prevent separation of said shelves except by manual adjustment.

9. In a basket carrying cart of a type such as that used in self-service stores, in which a basket carrying shelf is supported in substantially horizontal position, the improvement comprising a rigidly constructed frame for holding said shelf in basket carrying position and having wheels carried within the lower part of the frame, said frame including a single strip providing oppositely disposed side bars and upper and lower end bars, said upper end bar providing a handle bar for said cart and said lower end bar providing a wheel support, said handle bar being rounded in cross section to provide a handle grip and said lower end bar also being rounded in cross section to provide a bumper, and both said rounded bars thereby providing transverse strengthening members for said cart.

10. In a cart wherein a basket carrying shelf is supported in basket carrying position, the improvement comprising a frame for holding the shelf in said position, which frame is supported on wheels, said frame including two oppositely disposed but connected side bars which constitute a single continuous member bent back upon itself at the bottom of each of said side bars with portions thereof in spaced apart relation, each of which spaced portions rotatably support between them one of said wheels.

11. In a cart wherein a basket carrying shelf is supported in basket carrying position, the improvement comprising a frame for holding the shelf in said position, which frame is supported on wheels, said frame having spaced parallel side members, each of said side members being provided at its lower end with a loop portion which encompasses one of the wheels and forms a support at opposite sides of the wheel for rotatably mounting the same, said loop extending beyond the periphery of the wheel.

HAROLD I. SIDES.